United States Patent
Huang (10) Patent No.: US 9,575,984 B2
(45) Date of Patent: *Feb. 21, 2017

(54) SIMILARITY ANALYSIS METHOD, APPARATUS, AND SYSTEM

(71) Applicant: Huawei Technologies Co., Ltd., Shenzhen (CN)

(72) Inventor: Yan Huang, Chengdu (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/162,866

(22) Filed: May 24, 2016

(65) Prior Publication Data
US 2016/0267099 A1 Sep. 15, 2016

Related U.S. Application Data

(63) Continuation of application No. 14/090,437, filed on Nov. 26, 2013, now Pat. No. 9,372,867.

(30) Foreign Application Priority Data

Nov. 28, 2012 (CN) .......................... 2012 1 0494714

(51) Int. Cl.
*G06F 7/00* (2006.01)
*G06F 17/00* (2006.01)
(Continued)

(52) U.S. Cl.
CPC .......... *G06F 17/30156* (2013.01); *G06F 3/067* (2013.01); *G06F 3/0608* (2013.01);
(Continued)

(58) Field of Classification Search
CPC ............ G06F 17/30489; G06F 11/1453; G06F 17/30156; G06F 3/0641
(Continued)

(56) References Cited

U.S. PATENT DOCUMENTS 7,379,875 B2 * 5/2008 Burges .............. G06F 17/30743
700/94
7,962,520 B2 * 6/2011 Patterson .......... G06F 17/30312
707/791
(Continued)

FOREIGN PATENT DOCUMENTS

CN 102222085 A 10/2011
CN 102495894 A 6/2012

OTHER PUBLICATIONS

Partial English Translation and Abstract of Chinese Patent Application No. CN102222085, May 8, 2015, 16 pages.
(Continued)

*Primary Examiner* — Binh V Ho
(74) *Attorney, Agent, or Firm* — Fish & Richardson P.C.

(57) ABSTRACT

A similarity analysis method, an apparatus, and a system where the method includes acquiring file fingerprint information of a file to be analyzed, sending an analysis request that carries the file fingerprint information to at least two MDSs, selecting at least one group according to an analysis result returned by each MDS, where the analysis result includes a group number and a similarity of at least one group that has the highest similarity with the file fingerprint information and is found by the MDS, and the MDS locally queries a duplicate data block in the selected group. Hence, each MDS needs to query only a file fingerprint information set of a group that the MDS itself is responsible for, which reduces the amount of data retrieval and waiting time of reading, writing, and locking a database file.

18 Claims, 3 Drawing Sheets

(51) Int. Cl.
*G06F 17/30* (2006.01)
*G06F 3/06* (2006.01)

(52) U.S. Cl.
CPC .......... *G06F 3/0611* (2013.01); *G06F 3/0641* (2013.01); *G06F 17/30595* (2013.01)

(58) Field of Classification Search
USPC .......................................................... 707/687
See application file for complete search history.

(56) References Cited

U.S. PATENT DOCUMENTS

| | | | | |
|---|---|---|---|---|
| 8,838,657 | B1* | 9/2014 | Malone | G06F 17/30011 707/609 |
| 2008/0244204 | A1* | 10/2008 | Cremelie | G06F 11/2097 711/162 |
| 2011/0099351 | A1* | 4/2011 | Condict | G06F 3/0608 711/216 |
| 2011/0258404 | A1* | 10/2011 | Arakawa | G06F 3/0608 711/162 |
| 2013/0144845 | A1* | 6/2013 | Ghuge | G06F 17/3015 707/692 |
| 2013/0212073 | A1* | 8/2013 | Cochrane | G09B 7/02 707/687 |
| 2013/0290277 | A1* | 10/2013 | Chambliss | G06F 17/30489 707/692 |
| 2014/0059017 | A1* | 2/2014 | Chaney | G06F 17/30595 707/692 |

OTHER PUBLICATIONS

Partial English Translation and Abstract of Chinese Patent Application No. CN102495894, May 8, 2015, 35 pages.
Wang, S., "Development and Application of De-Duplication Technology," ZTE Communications, vol. 16, No. 5, Oct. 2010, pp. 9-14.
Fu, Y., et al., "A Scalable Inline Cluster Deduplication Framework for Big Data Protection," XP055110964, CSE Technical Reports, May 30, 2012, 22 pages.
Foreign Communication From a Counterpart Application, Chinese Application No. 201210494714.3, Chinese Office Action dated Mar. 31, 2015, 9 pages.
Office Action dated Nov. 6, 2015, 12 pages, U.S. Appl. No. 14/090,437, filed Nov. 26, 2013.
Foreign Communication From a Counterpart Application, European Application No. 13194385.4, European Office Action dated May 20, 2015, 8 pages.
Foreign Communication From a Counterpart Application, European Application No. 13194385.4, Extended European Search Report dated Apr. 10, 2014, 8 pages.

* cited by examiner

SIMILARITY ANALYSIS METHOD, APPARATUS, AND SYSTEM

CROSS-REFERENCE TO RELATED APPLICATION

This application is a continuation of U.S. patent application Ser. No. 14/090,437, filed on Nov. 26, 2013, which claims priority to Chinese Patent Application No. 201210494714.3, filed on Nov. 28, 2012, both of which are hereby incorporated by reference in their entireties.

TECHNICAL FIELD

Embodiments of the present disclosure relate to the field of data storage, and in particular to a similarity analysis method, an apparatus, and a system.

BACKGROUND

With development of technologies, the amount of information in the society increases sharply, and an increase in the amount of data that needs to be stored and consequent increases in storage capacity and storage costs have become an important problem that an enterprise needs to consider. A data de-duplication technology effectively reduces required storage capacity in scenarios such as a data backup scenario and reduces storage costs by storing only a unique instance for the same data appearing many times in stored data. In the data de-duplication technology, using multi-node concurrent data de-duplication to accelerate a processing rate of data de-duplication and improve performance of the data de-duplication has been proved to be an effective method.

In the multi-node data de-duplication solution, when querying a duplicate data block, each block needs to query all block records to confirm whether duplicate data exists. Therefore, the querying takes a long time when there is a large amount of data de-duplication. To improve the performance of data de-duplication, each block of a file with a relatively high similarity is compared with each block in a group that has a relatively high similarity with the file in order to perform data de-duplication in a group. In this way, only a block record in the group needs to be queried when a duplicate data block is queried, and the objective of improving the performance of the data de-duplication is achieved by compromising a limited de-duplication rate.

Although the multi-node data de-duplication based on group reduces data querying time, when a similarity analysis is performed on a file to determine a group, a fingerprint of each file needs to be queried and matched with fingerprints of all groups because a fingerprint of a file and fingerprints of all groups need to be queried and matched to determine a similarity. In addition, for the purpose of ensuring querying accuracy, when a similarity analysis is performed on each file, a file that saves a group fingerprint needs to be locked. As a result, multiple nodes cannot concurrently perform the matching querying, which is a performance bottleneck of multi-node data de-duplication of a group.

SUMMARY

Embodiments of the present disclosure provide a similarity analysis method, an apparatus, and a system, which are used to solve a problem that existing similarity analysis becomes a performance bottleneck of multi-node data de-duplication of a group.

According to a first aspect, an embodiment of the present disclosure provides a similarity analysis method, including acquiring file fingerprint information of a file to be analyzed, sending an analysis request that carries the file fingerprint information to at least two meta data servers (MDSs) such that the at least two MDSs query their respective local file fingerprint information sets according to the file fingerprint information, where each file fingerprint information set includes file fingerprint information in each group that the MDSs are responsible for, selecting at least one group according to an analysis result returned by each MDS, where the analysis result includes a group number and a similarity of at least one group that has the highest similarity with the file fingerprint information and is found by each MDS according to each local file fingerprint information set, and sending block fingerprint information, acquired in advance, of each data block in the file to be analyzed to an MDS that the selected group belongs to such that the MDS compares the block fingerprint information of each data block in the file to be analyzed with a local block fingerprint information base in the selected group in order to query a duplicate data block, where the block fingerprint information base in the selected group includes block fingerprint information.

In a first possible implementation manner of the first aspect, selecting at least one group according to an analysis result returned by each MDS includes selecting at least one group corresponding to the at least one highest similarity if at least one highest similarity in the analysis result returned by each MDS is higher than a preset threshold, and selecting at least one pre-established idle group if no similarity in the analysis result returned by each MDS is higher than the preset threshold.

In combination with the first possible implementation manner of the first aspect, in a second possible implementation manner of the first aspect, the analysis result further includes load information of each MDS, and selecting at least one pre-established idle group includes selecting at least one idle group that belongs to an MDS with a minimum load.

In combination with the first aspect or several possible implementation manners of the first aspect, in a third possible implementation manner of the first aspect, before acquiring file fingerprint information of a file to be analyzed, the method further includes establishing a preset number of idle groups, and allocating the preset number of idle groups to the multiple MDSs according to a preset allocation policy.

According to a second aspect, an embodiment of the present disclosure provides a similarity analysis method, including receiving an analysis request sent by a data de-duplicate engine (DDE), where the analysis request carries file fingerprint information of a file to be analyzed, querying each local file fingerprint information set, where each file fingerprint information set includes file fingerprint information in each group that an MDS is responsible for, and acquiring a similarity between the file fingerprint information in the analysis request and each group that the MDS is responsible for, and sending an analysis result to the DDE, where the analysis result includes a group number and a similarity of at least one group that has the highest similarity with the file fingerprint information.

In a first possible implementation manner of the second aspect, querying each local file fingerprint information set and acquiring a similarity between the file fingerprint information in the analysis request and each group that the MDS is responsible for include acquiring a similarity between file fingerprint information of each file in each group and the file fingerprint information in the analysis request, and using, based on each group, the highest similarity among similarities between file fingerprint information of each file in a group and the file fingerprint information in the analysis request as a similarity between the group and the file fingerprint information in the analysis request in order to obtain the similarity between each group and the file fingerprint information in the analysis request.

In combination with the second aspect or the first possible implementation manner of the second aspect, in a second possible implementation manner of the second aspect, after sending an analysis result to the DDE, the method further includes receiving a querying request of the DDE, where the querying request includes block fingerprint information of each data block in the file to be analyzed and a group number of a group selected by the DDE, comparing the block fingerprint information of each data block with a block fingerprint information base in the selected group in order to query a duplicate data block, where the block fingerprint information base in the selected group includes block fingerprint information, saving block fingerprint information of a non-duplicate data block among each data block to the block fingerprint information base in the selected group, and saving the file fingerprint information of the file to be analyzed to a file fingerprint information set in the selected group.

According to a third aspect, an embodiment of the present disclosure provides a data DDE, including an acquiring module configured to acquire file fingerprint information of a file to be analyzed, a sending module configured to send an analysis request that carries the file fingerprint information to at least two MDSs such that the at least two MDSs query their respective local file fingerprint information sets according to the file fingerprint information, where each file fingerprint information set includes file fingerprint information in each group that the MDSs are responsible for, a selecting module configured to select at least one group according to an analysis result returned by each MDS, where the analysis result includes a group number and a similarity of at least one group that has the highest similarity with the file fingerprint information and is found by each MDS according to each local file fingerprint information set, and an allocation module configured to send block fingerprint information, acquired in advance, of each data block in the file to be analyzed to an MDS that the selected group belongs to such that the MDS compares the block fingerprint information of each data block in the file to be analyzed with a local block fingerprint information base in the selected group in order to query a duplicate data block, where the block fingerprint information base in the selected group includes block fingerprint information.

In a first possible implementation manner of the third aspect, the selecting module is further configured to select at least one group corresponding to the at least one highest similarity if at least one highest similarity in the analysis result returned by each MDS is higher than a preset threshold, and select at least one pre-established idle group if no similarity in the analysis result returned by each MDS is higher than the preset threshold.

In combination with the first possible implementation manner of the third aspect, in a second possible implementation manner of the third aspect, the analysis result further includes load information of each MDS, and in the condition that no similarity in the analysis result returned by each MDS is higher than the preset threshold, the selecting module selects at least one idle group that belongs to an MDS with a minimum load.

In combination with the third aspect or the several possible implementation manners of the third aspect, in a third possible implementation manner of the third aspect, the DDE further includes a group establishing module configured to establish a preset number of idle groups before the acquiring module acquires the file fingerprint information of the file to be analyzed, and a group allocation module configured to allocate the preset number of idle groups to the multiple MDSs according to a preset allocation policy.

According to a fourth aspect, an embodiment of the present disclosure provides a MDS, including a receiving module configured to receive an analysis request sent by a data DDE, where the analysis request carries file fingerprint information of a file to be analyzed, an analysis module configured to query each local file fingerprint information set, where each file fingerprint information set includes file fingerprint information in each group that the MDS is responsible for, and acquire a similarity between the file fingerprint information in the analysis request and each group that the MDS is responsible for, and a sending module configured to send an analysis result to the DDE, where the analysis result includes a group number and a similarity of at least one group that has the highest similarity with the file fingerprint information.

In a first possible implementation manner of the fourth aspect, the analysis module is further configured to acquire a similarity between file fingerprint information of each file in each group and the file fingerprint information in the analysis request, and use, based on each group, the highest similarity among similarities between file fingerprint information of each file in a group and the file fingerprint information in the analysis request as a similarity between the group and the file fingerprint information in the analysis request in order to obtain the similarity between each group and the file fingerprint information in the analysis request.

In combination with the fourth aspect or the first possible implementation manner of the fourth aspect, in a second possible implementation manner of the fourth aspect, the receiving module is further configured to receive a querying request of the DDE, where the querying request includes block fingerprint information of each data block in the file to be analyzed and a group number of a group selected by the DDE, and the MDS further includes a querying module configured to compare the block fingerprint information of each data block with a block fingerprint information base in the selected group in order to query a duplicate data block, where the block fingerprint information base in the selected group includes block fingerprint information in the selected group, and a saving module configured to save block fingerprint information of a non-duplicate data block among each data block to the block fingerprint information base in the selected group, and save the file fingerprint information of the file to be analyzed to a file fingerprint information set in the selected group.

According to a fifth aspect, an embodiment of the present disclosure provides a similarity analysis system, including the DDE and multiple MDSs described above.

At least one technical solution among the multiple technical solutions brings the following advantage or beneficial effect.

In this embodiment of the present disclosure, the following technical means are adopted. Send an analysis request that carries file fingerprint information to at least two MDSs such that the at least two MDSs query their respective local file fingerprint information sets, a local file fingerprint information set of each group that each MDS is responsible for, select at least one group according to an analysis result that is returned by each MDS and carries a found group number and a similarity of at least one group that has the highest similarity with the file fingerprint information, and send block fingerprint information of each data block in the file to be analyzed to an MDS that the selected group belongs to such that the MDS queries a duplicate data block. In this way, each MDS needs to query only a file fingerprint information set of a group that the MDS itself is responsible for, which reduces the amount of data retrieval and waiting time of reading, writing, and locking a database file. Further, multiple MDSs concurrently complete a similarity analysis, thereby improving performance of the similarity analysis. In addition, in this embodiment of the present disclosure, an MDS completes a large number of calculation and sorting work in the similarity analysis, thereby reducing occupied resources of a DDE.

BRIEF DESCRIPTION OF DRAWINGS

To illustrate the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the embodiments of the present disclosure more comprehensible, the following clearly describes the technical solutions in the embodiments of the present disclosure with reference to the accompanying drawings in the embodiments of the present disclosure. The described embodiments are merely a part rather than all of the embodiments of the present disclosure. All other embodiments obtained by a person of ordinary skill in the art based on the embodiments of the present disclosure without creative efforts shall fall within the protection scope of the present disclosure.

Figure 1:
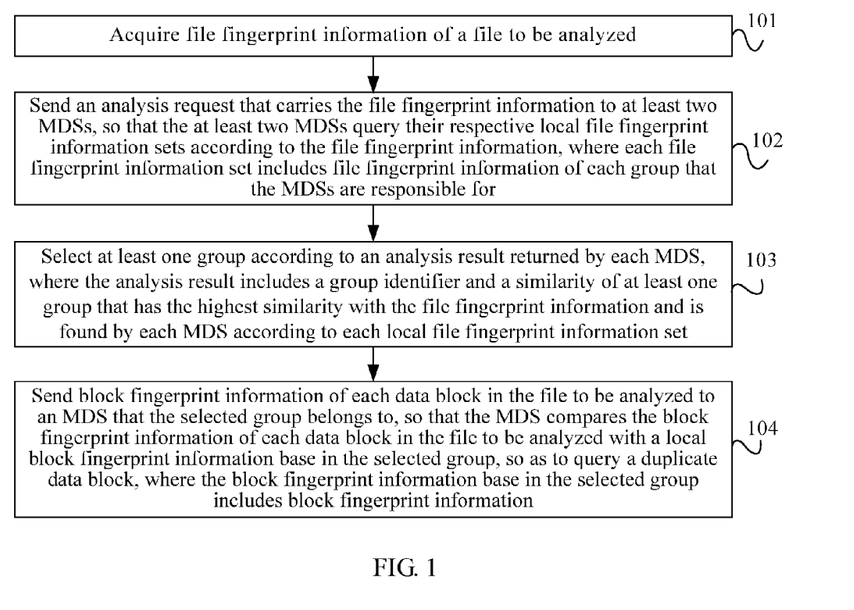
FIG. 1 is a schematic flowchart of a similarity analysis method according to an embodiment of the present disclosure.

FIG. 1 is a schematic flowchart of a similarity analysis method according to an embodiment of the present disclosure. As shown in FIG. 1, the method includes the following steps.

Step 101: Acquire file fingerprint information of a file to be analyzed.

For example, a data DDE provided in an embodiment of the present disclosure acquires the file fingerprint information of the file to be analyzed. The file to be analyzed may be any file to be stored.

Step 101 may include dividing the file to be analyzed into at least one data block, extracting block fingerprint information of at least one data block from a data block obtained after the file to be analyzed is processed, and combining the block fingerprint information of the at least one data block into the file fingerprint information of the file to be analyzed.

Block fingerprint information of a data block is included in meta data of the data block. The method of combining the block fingerprint information of the at least one data block into the file fingerprint information of the file to be analyzed includes combining block fingerprint information of all of or part of data blocks of the file to be analyzed into the file fingerprint information of the file to be analyzed.

Step 102: Send an analysis request that carries the file fingerprint information to at least two MDSs such that the at least two MDSs query their respective local file fingerprint information sets according to the file fingerprint information, where each file fingerprint information set includes file fingerprint information in each group that the MDSs are responsible for.

Furthermore, the multiple MDSs may be located on different nodes in a storage system. Generally, one MDS and one DDE are set on each node in the storage system. Each group includes a file fingerprint information set and a block fingerprint information base of the group, and each group has a unique group number. A file fingerprint information set of a group includes all file fingerprint information of the group, and a block fingerprint information base of a group includes all block fingerprint information of the group. Alternatively, a group that each MDS is responsible for is determined when a group is pre-established. One MDS may be responsible for one or more groups. If m groups are pre-established and there are n MDSs in total, each MDS is responsible for maintaining m/n groups according to an average allocation policy, that is, each MDS is responsible for file fingerprint information sets and block fingerprint information bases of m/n groups. Furthermore, both a file fingerprint information set and a block fingerprint information base are stored in the form of a database file.

The file fingerprint information set of each group includes at least one piece of file fingerprint information. Each MDS traverses each piece of file fingerprint information in a file fingerprint information set of a group that each MDS is responsible for, calculates a similarity between the file fingerprint information in the analysis request and each piece of file fingerprint information in the file fingerprint information set of the group that each MDS is responsible for. For example, the file fingerprint information in the analysis request is (A, B, C), and file fingerprint information in a file fingerprint information set is (A, C, D, E). In this case, a similarity of the two is the number of pieces of same block fingerprint information of the two divided by the total number of pieces of block fingerprint information of the two, that is, 2/5=0.4. The foregoing is only an example of a method for calculating a similarity, and this embodiment does not limit a method for calculating a similarity.

Step 103: Select at least one group according to an analysis result returned by each MDS, where the analysis result includes a group number and a similarity of at least one group that has the highest similarity with the file fingerprint information and is found by each MDS according to each local file fingerprint information set.

A group that has the highest similarity may be selected. Accordingly, step 103 may include selecting at least one group that has the highest similarity in the analysis result returned by each MDS.

Alternatively, selecting at least one group according to an analysis result returned by each MDS may include determining whether the at least one group that has the highest similarity in the analysis result returned by the MDS complies with a preset group selection policy, where the group selection policy generally refers to a similarity threshold. Accordingly, step 103 may include selecting at least one group corresponding to the at least one highest similarity if at least one highest similarity in the analysis result returned by each MDS is higher than a preset threshold.

At least one pre-established idle group is selected if no similarity in the analysis result returned by each MDS is higher than the preset threshold. Further, for the purpose of achieving load balance, an idle group that belongs to an MDS with a relatively low load may be selected during idle group selection. Accordingly, the analysis result further includes load information of each MDS, and selecting at least one pre-established idle group includes selecting at least one idle group that belongs to an MDS with a minimum load.

Furthermore, the load information of each MDS includes the number of files that the MDS is querying for a duplicate data block.

Further, before step 101, the method further includes establishing a preset number of idle groups, and allocating the preset number of idle groups to the multiple MDSs according to a preset allocation policy.

Furthermore, during initialization, according to the quantity in a configuration file and an allocation policy, a corresponding number of idle groups are established and all the established idle groups are allocated to the multiple MDSs. For example, the allocation policy may be random allocation or average allocation. Each MDS is responsible for maintaining a group allocated to itself, and an MDS may be responsible for one or more groups. Generally, establishing an idle group refers to that a group number and storage space are allocated for the group and a file fingerprint information set and a block fingerprint information base of the idle group are empty.

Step 104: Send block fingerprint information of each data block in the file to be analyzed to an MDS that the selected group belongs to such that the MDS compares the block fingerprint information of each data block in the file to be analyzed with a local block fingerprint information base in the selected group in order to query a duplicate data block, where the block fingerprint information base in the selected group includes block fingerprint information.

Furthermore, if one group is selected, the block fingerprint information of each data block in the file to be analyzed is sent to the MDS that the selected group belongs to, and if multiple groups are selected, the block fingerprint information of each data block in the file to be analyzed is sent to an MDS that each of the selected groups belongs to, where each of the selected groups is preferentially belongs to the same MDS, and this is not limited in this embodiment.

Furthermore, the MDS that the selected group belongs to queries whether the block fingerprint information base of the selected group has block fingerprint information that is the same as the block fingerprint information of the data block in the file to be analyzed. If yes, it indicates that a block the same as the data block exists. If no, it indicates that no block the same as the data block exists, and then the block fingerprint information of the data block is added into the block fingerprint information base of the selected group. Afterwards, the MDS that the selected group belongs to saves the file fingerprint information of the file to be analyzed to a file fingerprint information set in the selected group. It should be noted that, because a block fingerprint information base of an idle group is empty, if an idle group is selected in step 103, the MDS cannot find block fingerprint information the same as the block fingerprint information of each data block in the file to be analyzed. Accordingly, the MDS stores the block fingerprint information of each data block in the file to be analyzed into the block fingerprint information base of the idle group, and saves the file fingerprint information of the file to be analyzed into the file fingerprint information set of the idle group. Then, the idle group is not idle any more.

In step 102, alternatively, the DDE directly broadcasts the analysis request that carries the file fingerprint information to all MDSs. Alternatively, the DDE first matches the file fingerprint information of the file to be analyzed with pre-stored characteristic information of each group, determines a group matching the file to be analyzed, and then sends the analysis request to the MDS that the matched group belongs to. Further, characteristic information of each group may be obtained according to a file fingerprint information set of each group. It should be noted that, in this scenario, matching workload of the DDE is less than the workload for the MDS to calculate a similarity between file fingerprint information in an analysis request and each group.

In this embodiment of the present disclosure, the following technical means are adopted: send an analysis request that carries file fingerprint information to at least two MDSs such that the at least two MDSs query, according to the file fingerprint information, their respective local file fingerprint information sets of each group that each MDS is responsible for, select at least one group according to an analysis result that is returned by each MDS and carries a found group number and a similarity of at least one group that has the highest similarity with the file fingerprint information, and send block fingerprint information of each data block in the file to be analyzed to the MDS that the selected group belongs to such that the MDS queries a duplicate data block. In this way, each MDS needs to query only a file fingerprint information set of a group that the MDS itself is responsible for, which reduces the amount of data retrieval and waiting time of reading, writing, and locking a database file. Further, multiple MDSs concurrently complete a similarity analysis, thereby improving the performance of the similarity analysis. In addition, in this embodiment of the present disclosure, an MDS completes a large number of calculation and sorting work in the similarity analysis, thereby reducing occupied resources of a DDE.

Figure 2:
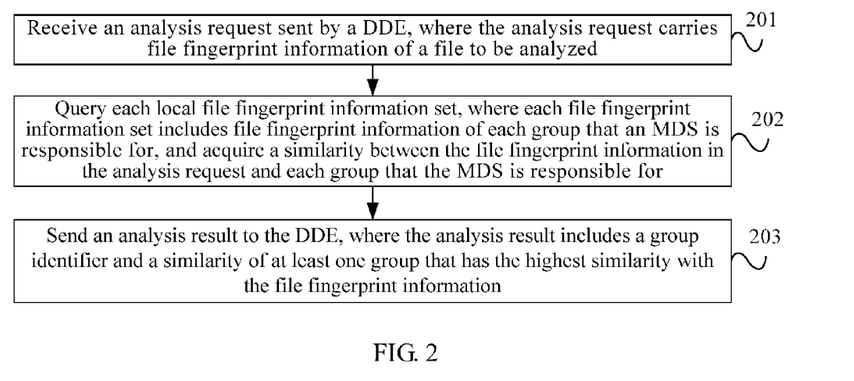
FIG. 2 is a schematic flowchart of another similarity analysis method according to an embodiment of the present disclosure.

FIG. 2 is a schematic flowchart of another similarity analysis method according to an embodiment of the present disclosure. As shown in FIG. 2, the method includes the following steps.

Step 201: Receive an analysis request sent by a DDE, where the analysis request carries file fingerprint information of a file to be analyzed.

For example, each MDS provided in an embodiment of the present disclosure separately receives the analysis request sent by the DDE. The file to be analyzed may be any file to be stored. Furthermore, the DDE is located on one node in a storage system. Generally, one MDS and one DDE are set on each node in the storage system.

Step 202: Query each local file fingerprint information set, where each file fingerprint information set includes file fingerprint information in each group that an MDS is responsible for, and acquire a similarity between the file fingerprint information in the analysis request and each group that the MDS is responsible for.

Furthermore, each group includes a file fingerprint information set and a block fingerprint information base of the group, and each group has a unique group number. Alternatively, a group that each MDS is responsible for is determined when a group is pre-established. One MDS may be responsible for one or more groups. For example, if m groups are pre-established and there are n MDSs in total, each MDS is responsible for maintaining m/n groups according to an average allocation policy, that is, each MDS is responsible for file fingerprint information sets and block fingerprint information bases of m/n groups. Furthermore, both a file fingerprint information set and a block fingerprint information base are stored in the form of a database file.

The file fingerprint information set of each group includes at least one piece of file fingerprint information. Each MDS traverses each piece of file fingerprint information in a file fingerprint information set of a group that each MDS is responsible for, calculates a similarity between the file fingerprint information in the analysis request and each piece of file fingerprint information in the file fingerprint information set of the group that each MDS is responsible for. For example, the file fingerprint information in the analysis request is (A, B, C), and file fingerprint information in a file fingerprint information set is (A, C, D, E). In this case, a similarity of the two is the number of pieces of same block fingerprint information of the two divided by the total number of pieces of block fingerprint information of the two, that is, 2/5=0.4.

Furthermore, step 202 may include acquiring a similarity between file fingerprint information of each file in each group and the file fingerprint information in the analysis request, and using, based on each group, the highest similarity among similarities between file fingerprint information of each file in a group and the file fingerprint information in the analysis request as a similarity between the group and the file fingerprint information in the analysis request in order to obtain the similarity between each group and the file fingerprint information in the analysis request.

For example, the file fingerprint information in the analysis request is X, and a file fingerprint information set in group A includes file fingerprint information a, b, and c. If a similarity between X and a is 0.5, a similarity between X and b is 0.7, and a similarity between X and c is 0.45, a similarity between X and group A is 0.7.

Step 203: Send an analysis result to the DDE, where the analysis result includes a group number and a similarity of at least one group that has the highest similarity with the file fingerprint information.

For example, an MDS is responsible for group A, group B, and group C. A similarity between the file fingerprint information X in the analysis request and group A is 0.7, a similarity between the file fingerprint information X in the analysis request and group B is 0.6, and a similarity between the file fingerprint information X in the analysis request and group C is 0.5. If the analysis result includes a group number and a similarity of only one group with the highest similarity, the analysis result includes the similarity 0.7 and the group number of group A, which may be alternatively expressed by a 2-tuple (A, 0.7). If the analysis result includes group numbers and similarities of two groups with the highest similarity, the analysis result includes the similarity 0.7 and the group number of group A, and the similarity 0.6 and the group number of group B, which may be alternatively expressed by (A, 0.7) and (B, 0.6). Generally, the number of groups with the highest similarity and whose group numbers and similarities are included in the analysis result may be preset and may also be specified by the DDE in the analysis request.

Further, if the DDE selects a group that the MDS is responsible for to query a duplicate data block, after step 203, the method may further include receiving a querying request of the DDE, where the querying request includes block fingerprint information of each data block in the file to be analyzed and a group number of a group selected by the DDE, comparing the block fingerprint information of each data block with a block fingerprint information base in the selected group in order to query a duplicate data block, where the block fingerprint information base in the selected group includes block fingerprint information, saving block fingerprint information of a non-duplicate data block among each data block to the block fingerprint information base in the selected group, and saving the file fingerprint information of the file to be analyzed to a file fingerprint information set in the selected group.

Generally, the DDE selects at least one group to query a duplicate data block. Furthermore, if one group is selected, the block fingerprint information of each data block in the file to be analyzed is sent to the MDS that the selected group belongs to, if multiple groups are selected, the block fingerprint information of each data block in the file to be analyzed is sent to an MDS that each of the selected groups belongs to, where each of the selected groups is preferentially belongs to the same MDS, and this is not limited in this embodiment.

If an MDS receives a querying request of a DDE, it indicates that the DDE selects a group that the MDS is responsible for to query a duplicate data block, if the querying request of the DDE includes only a group number of one group of the MDS in addition to block fingerprint information of each data block, the MDS queries a duplicate data block only in the group. If the querying request of the DDE includes only group numbers of multiple groups of the MDS in addition to block fingerprint information of each data block, the MDS queries a duplicate data block only in the multiple groups. Furthermore, a data block is a non-duplicate data block only when no block fingerprint information the same as block fingerprint information of the data block is found in block fingerprint information bases of the multiple groups. The block fingerprint information of the non-duplicate data block is saved into the block fingerprint information base of a group among the multiple groups. Accordingly, the file fingerprint information of the file to be analyzed is saved into the file fingerprint information set of the group.

In this embodiment of the present disclosure, the following technical means are adopted: receive an analysis request that is sent by a DDE and carries file fingerprint information, query a file fingerprint information set of each group that an MDS is responsible for, acquire a similarity between the file fingerprint information and each group that the MDS is responsible for, and send an analysis result including a group number and a similarity of at least one group that has the highest similarity with the file fingerprint information to the DDE such that the DDE selects at least one group to query a duplicate data block. In this way, each MDS needs to query only a file fingerprint information set of a group that the MDS itself is responsible for, which reduces the amount of data retrieval and waiting time of reading, writing, and locking a database file. Further, multiple MDSs concurrently complete a similarity analysis, thereby improving performance of the similarity analysis. In addition, in this embodiment of the present disclosure, an MDS completes a large number of calculation and sorting work in the similarity analysis, thereby reducing occupied resources of a DDE.

Persons of ordinary skill in the art may understand that all or a part of the steps in each of the foregoing method embodiments may be implemented by a program instructing relevant hardware. The program may be stored in a computer readable storage medium. When the program is run, the steps in the method embodiments are performed. The storage medium may be any medium that is capable of storing program codes, such as a read-only memory (ROM), a random-access memory (RAM), a magnetic disk, or an optical disk.

Figure 3:
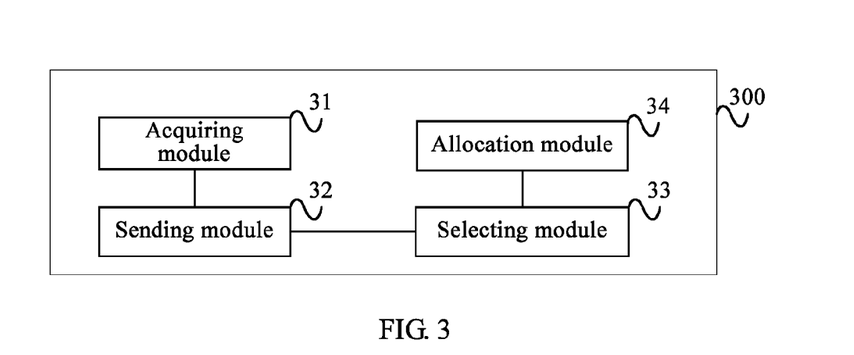
FIG. 3 is a schematic structural diagram of a DDE 300 according to an embodiment of the present disclosure.

FIG. 3 is a schematic structural diagram of a DDE 300 according to an embodiment of the present disclosure. As shown in FIG. 3, the DDE 300 includes an acquiring module 31 configured to acquire file fingerprint information of a file to be analyzed, a sending module 32 configured to send an analysis request that carries the file fingerprint information to at least two MDSs such that the at least two MDSs query their respective local file fingerprint information sets according to the file fingerprint information, where each file fingerprint information set includes file fingerprint information in each group that the MDSs are responsible for, a selecting module 33 configured to select at least one group according to an analysis result returned by each MDS, where the analysis result includes a group number and a similarity of at least one group that has the highest similarity with the file fingerprint information and is found by each MDS according to each local file fingerprint information set, and an allocation module 34 configured to send block fingerprint information, acquired in advance, of each data block in the file to be analyzed to an MDS that the selected group belongs to such that the MDS compares the block fingerprint information of each data block in the file to be analyzed with a local block fingerprint information base in the selected group in order to query a duplicate data block, where the block fingerprint information base in the selected group includes block fingerprint information.

In this embodiment, the DDE 300 and each MDS may be located on a same node or different nodes in a storage system. Generally, one MDS and one DDE are set on each node.

The selecting module 33 is further configured to select at least one group with the highest similarity in an analysis result returned by each MDS.

Alternatively, the selecting module 33 is further configured to select at least one group corresponding to the at least one highest similarity if at least one highest similarity in the analysis result returned by each MDS is higher than a preset threshold.

The selecting module 33 is further configured to select at least one pre-established idle group if no similarity in the analysis result returned by each MDS is higher than the preset threshold.

Preferentially, the analysis result further includes load information of each MDS, and in the condition that no similarity in the analysis result returned by each MDS is higher than the preset threshold, the selecting module 33 selects at least one idle group that belongs to an MDS with a minimum load.

Furthermore, the load information of each MDS includes the number of files that the MDS is querying for a duplicate data block.

The DDE 300 further includes a group establishing module configured to establish a preset number of idle groups before the acquiring module 31 acquires the file fingerprint information of the file to be analyzed, and a group allocation module configured to allocate the preset number of idle groups to the multiple MDSs according to a preset allocation policy.

Further, the acquiring module 31 includes a block dividing unit configured to divide the file to be analyzed into at least one data block, an extraction unit configured to extract block fingerprint information of at least one data block from a data block obtained after the file is processed, a generation unit configured to combine the block fingerprint information of the at least one data block into the file fingerprint information of the file to be analyzed.

For specific implementation of this embodiment, refer to a similarity analysis method provided in the embodiment of the present disclosure. In this embodiment of the present disclosure, the following technical means are adopted. A DDE sends an analysis request that carries file fingerprint information to at least two MDSs such that the at least two MDSs separately query, according to the file fingerprint information, their respective local file fingerprint information sets of each group that each MDS is responsible for, selects at least one group according to an analysis result that is returned by each MDS and carries a found group number and a similarity of at least one group that has the highest similarity with the file fingerprint information, and sends block fingerprint information of each data block in the file to be analyzed to the MDS that the selected group belongs to such that the MDS queries a duplicate data block. In this way, each MDS needs to query only a file fingerprint information set of a group that the MDS itself is responsible for, which reduces the amount of data retrieval and waiting time of reading, writing, and locking a database file. Further, multiple MDSs concurrently complete a similarity analysis, thereby improving performance of the similarity analysis. In addition, in this embodiment of the present disclosure, an MDS completes a large number of calculation and sorting work in the similarity analysis, thereby reducing occupied resources of a DDE.

Figure 4:
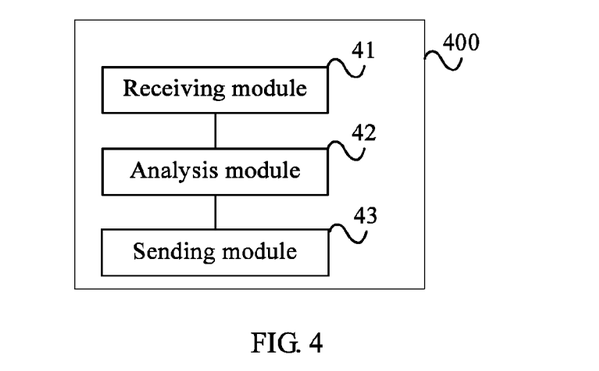
FIG. 4 is a schematic structural diagram of an MDS 400 according to an embodiment of the present disclosure.

FIG. 4 is a schematic structural diagram of an MDS 400 according to an embodiment of the present disclosure. As shown in FIG. 4, the MDS 400 includes a receiving module 41 configured to receive an analysis request sent by a DDE, where the analysis request carries file fingerprint information of a file to be analyzed, an analysis module 42 configured to query each local file fingerprint information set, where each file fingerprint information set includes file fingerprint information in each group that the MDS is responsible for, and acquire a similarity between the file fingerprint information in the analysis request and each group that the MDS is responsible for, and a sending module 43 configured to send an analysis result to the DDE, where the analysis result includes a group number and a similarity of at least one group that has the highest similarity with the file fingerprint information.

The analysis module 42 is further configured to acquire a similarity between file fingerprint information of each file in each group and the file fingerprint information in the analysis request, and use, based on each group, the highest similarity among similarities between file fingerprint information of each file in a group and the file fingerprint information in the analysis request as a similarity between the group and the file fingerprint information in the analysis request in order to obtain the similarity between each group and the file fingerprint information in the analysis request.

The receiving module 41 is further configured to receive a querying request of the DDE, where the querying request includes block fingerprint information of each data block in the file to be analyzed and a group number of a group selected by the DDE.

The MDS 400 further includes a querying module configured to compare the block fingerprint information of each data block with a block fingerprint information base in the selected group in order to query a duplicate data block, where the block fingerprint information base in the selected group includes block fingerprint information in the selected group, and a saving module configured to save block fingerprint information of a non-duplicate data block among each data block to the block fingerprint information base in the selected group, and save the file fingerprint information of the file to be analyzed to a file fingerprint information set in the selected group.

For specific implementation of this embodiment, refer to another similarity analysis method provided in the embodiment of the present disclosure. In this embodiment of the present disclosure, the following technical means are adopted. An MDS receives an analysis request that is sent by a DDE and carries file fingerprint information, queries a local file fingerprint information set in each group that the MDS is responsible for, acquires a similarity between the file fingerprint information and each group that the MDS is responsible for, and sends an analysis result including a group number and a similarity of at least one group that has the highest similarity with the file fingerprint information to the DDE such that the DDE selects at least one group to query a duplicate data block. In this way, each MDS needs to query only a file fingerprint information set of a group that the MDS itself is responsible for, which reduces the amount of data retrieval and waiting time of reading, writing, and locking a database file. Further, multiple MDSs concurrently complete a similarity analysis, thereby improving performance of the similarity analysis. In addition, in this embodiment of the present disclosure, an MDS completes a large number of calculation and sorting work in the similarity analysis, thereby reducing occupied resources of a DDE.

Figure 5:
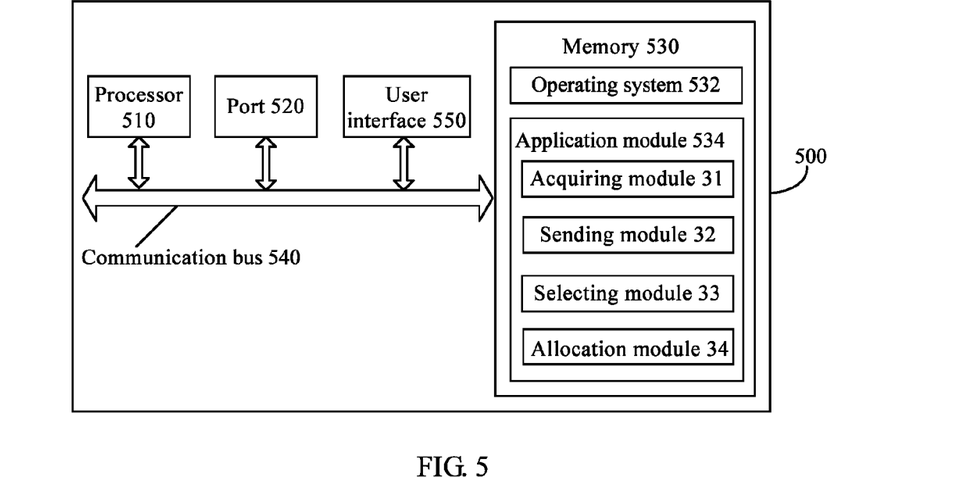
FIG. 5 is a schematic structural diagram of another DDE 500 according to an embodiment of the present disclosure.

FIG. 5 is a schematic structural diagram of another DDE 500 according to an embodiment of the present disclosure. As shown in FIG. 5, the DDE 500 generally includes at least one processor 510, for example, a central processing unit (CPU), a digital signal processor (DSP), at least one port 520, a memory 530, and at least one communication bus 540. The communication bus 540 is configured to implement connection communication among the apparatuses. The processor 510 is configured to perform an executable module stored in the memory 530, for example, a computer program. Alternatively, the DDE 500 may include a user interface 550, and the user interface 550 includes but is not limited to a monitor, a keyboard, and a clicking device, for example, a mouse, a trackball, a touch panel, or a touchscreen. The memory 530 may include a high-speed random access memory (RAM), and may further include a non-volatile memory, for example, at least one disk memory.

In some implementation manners, the memory 530 stores the following elements: an executable module or a data structure, or their subsets, or their extension sets: an operating system 532, including various system programs and configured to implement various basic services and process a hardware-based task, and an application module 534, including various application programs and configured to implement various application services.

The application module 534 includes but is not limited to an acquiring module 31, a sending module 32, a selecting module 33, and an allocation module 34. Further, the application module 534 includes a group establishing module and a group allocation module.

For specific implementation of each module in the application module 534, refer to a corresponding module in the DDE 300. No further details are provided herein.

In this embodiment of the present disclosure, the following technical means are adopted. A DDE sends an analysis request that carries file fingerprint information to at least two MDSs such that the at least two MDSs query, according to the file fingerprint information, their respective local file fingerprint information sets of each group that each MDS is responsible for, selects at least one group according to an analysis result that is returned by each MDS and carries a found group number and a similarity of at least one group that has the highest similarity with the file fingerprint information, and sends block fingerprint information of each data block in the file to be analyzed to the MDS that the selected group belongs to such that the MDS queries a duplicate data block. In this way, each MDS needs to query only a file fingerprint information set of a group that the MDS itself is responsible for, which reduces the amount of data retrieval and waiting time of reading, writing, and locking a database file. Further, multiple MDSs concurrently complete a similarity analysis, thereby improving performance of the similarity analysis. In addition, in this embodiment of the present disclosure, an MDS completes a large number of calculation and sorting work in the similarity analysis, thereby reducing occupied resources of a DDE.

Figure 6:
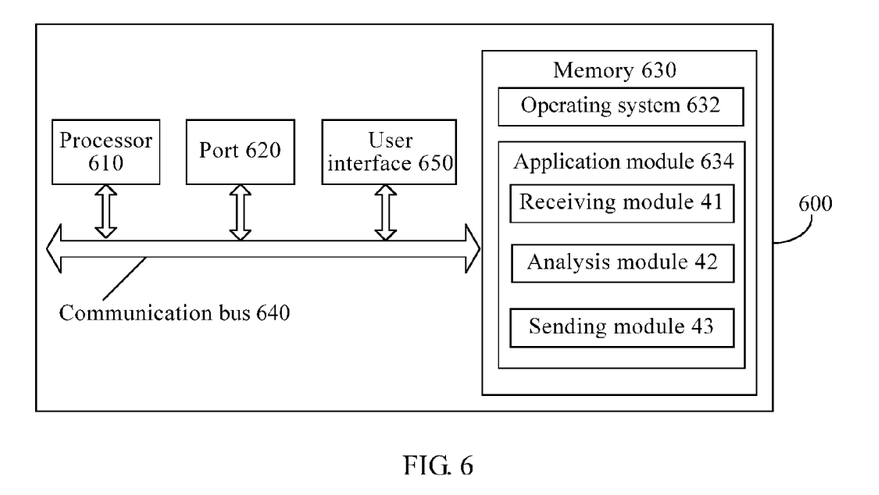
FIG. 6 is a schematic structural diagram of another MDS 600 according to an embodiment of the present disclosure.

FIG. 6 is a schematic structural diagram of another MDS 600 according to an embodiment of the present disclosure.

The MDS 600 generally includes at least one processor 610, for example, a CPU and a DSP, at least one port 620, a memory 630, and at least one communication bus 640.

The communication bus 640 is configured to implement connection communication among the apparatuses. The processor 610 is configured to perform an executable module stored in the memory 630, for example, a computer program. Alternatively, the MDS 600 may include a user interface 650, and the user interface 650 includes but is not limited to a monitor, a keyboard, and a clicking device, for example, a mouse, a trackball, a touch panel, or a touchscreen. The memory 630 may include a RAM, and may further include a non-volatile memory, for example, at least one disk memory.

In some implementation manners, the memory 630 stores the following elements, an executable module or a data structure, or their subsets, or their extension sets: an operating system 632, including various system programs and configured to implement various basic services and process a hardware-based task, and an application module 634, including various application programs and configured to implement various application services.

The application module 634 includes but is not limited to a receiving module 41, an analysis module 42, and a sending module 43. Further, the application module 634 further includes a querying module and a saving module.

For specific implementation of each module in the application module 634, refer to a corresponding module in the MDS 400. No further details are provided herein.

In this embodiment of the present disclosure, the following technical means are adopted. An MDS receives an analysis request that is sent by a DDE and carries file fingerprint information, queries a local file fingerprint information set in each group that the MDS is responsible for, acquires a similarity between the file fingerprint information and each group that the MDS is responsible for, and sends an analysis result including a group number and a similarity of at least one group that has the highest similarity with the file fingerprint information to the DDE such that the DDE selects at least one group to query a duplicate data block. In this way, each MDS needs to query only a file fingerprint information set of a group that the MDS itself is responsible for, which reduces the amount of data retrieval and waiting time of reading, writing, and locking a database file. Further, multiple MDSs concurrently complete a similarity analysis, thereby improving performance of the similarity analysis. In addition, in this embodiment of the present disclosure, an MDS completes a large number of calculation and sorting work in the similarity analysis, thereby reducing occupied resources of a DDE.

An embodiment of the present disclosure provides a computer program product, where the computer program product includes a computer readable storage medium for storing a program code, and the program code includes an instruction. The instruction is used to acquire file fingerprint information of a file to be analyzed, send an analysis request that carries the file fingerprint information to at least two MDSs such that the at least two MDSs query their respective local file fingerprint information sets according to the file fingerprint information, where each file fingerprint information set includes file fingerprint information in each group that the MDSs are responsible for, select at least one group according to an analysis result returned by each MDS, where the analysis result includes a group number and a similarity of at least one group that has the highest similarity with the file fingerprint information and is found by each MDS according to each local file fingerprint information set, and send block fingerprint information, acquired in advance, of each data block in the file to be analyzed to an MDS that the selected group belongs to such that the MDS compares the block fingerprint information of each data block in the file to be analyzed with a local block fingerprint information base in the selected group in order to query a duplicate data block, where the block fingerprint information base in the selected group includes block fingerprint information.

The instruction is further configured to select at least one group corresponding to the at least one highest similarity if at least one highest similarity in the analysis result returned by each MDS is higher than a preset threshold, and select at least one pre-established idle group if no similarity in the analysis result returned by each MDS is higher than the preset threshold.

The analysis result further includes load information of each MDS. The instruction is further configured to, in the condition that no similarity in the analysis result returned by each MDS is higher than the preset threshold, select at least one idle group that belongs to an MDS with a minimum load.

The instruction is further used to establish a preset number of idle groups, and allocate the preset number of idle groups to the multiple MDSs according to a preset allocation policy.

In this embodiment of the present disclosure, the following technical means are adopted. A DDE sends an analysis request that carries file fingerprint information to at least two MDSs such that the at least two MDSs query, according to the file fingerprint information, their respective local file fingerprint information sets of each group that each MDS is responsible for, selects at least one group according to an analysis result that is returned by each MDS and carries a found group number and a similarity of at least one group that has the highest similarity with the file fingerprint information, and sends block fingerprint information of each data block in the file to be analyzed to the MDS that the selected group belongs to such that the MDS queries a duplicate data block. In this way, each MDS needs to query only a file fingerprint information set of a group that the MDS itself is responsible for, which reduces the amount of data retrieval and waiting time of reading, writing, and locking a database file. Further, multiple MDSs concurrently complete a similarity analysis, thereby improving performance of the similarity analysis. In addition, in this embodiment of the present disclosure, an MDS completes a large number of calculation and sorting work in the similarity analysis, thereby reducing occupied resources of a DDE.

An embodiment of the present disclosure provides another computer program product, where the computer program product includes a computer readable storage medium for storing a program code, and the program code includes an instruction. The instruction is used to receive an analysis request sent by a DDE, where the analysis request carries file fingerprint information of a file to be analyzed, query each local file fingerprint information set, where each file fingerprint information set includes file fingerprint information in each group that an MDS is responsible for, and acquire a similarity between the file fingerprint information in the analysis request and each group that the MDS is responsible for, and send an analysis result to the DDE, where the analysis result includes a group number and a similarity of at least one group that has the highest similarity with the file fingerprint information.

The instruction is further used to acquire a similarity between file fingerprint information of each file in each group and the file fingerprint information in the analysis request, and use, based on each group, the highest similarity among similarities between file fingerprint information of each file in a group and the file fingerprint information in the analysis request as a similarity between the group and the file fingerprint information in the analysis request in order to obtain the similarity between each group and the file fingerprint information in the analysis request.

The instruction is further used to receive a querying request of the DDE, where the querying request includes block fingerprint information of each data block in the file to be analyzed and a group number of a group selected by the DDE, compare the block fingerprint information of each data block with a block fingerprint information base in the selected group in order to query a duplicate data block, where the block fingerprint information base in the selected group includes block fingerprint information, save block fingerprint information of a non-duplicate data block among each data block to the block fingerprint information base in the selected group, and save the file fingerprint information of the file to be analyzed to a file fingerprint information set in the selected group.

In this embodiment of the present disclosure, the following technical means are adopted. An MDS receives an analysis request that is sent by a DDE and carries file fingerprint information, queries a local file fingerprint information set in each group that the MDS is responsible for, acquires a similarity between the file fingerprint information and each group that the MDS is responsible for, and sends an analysis result including a group number and a similarity of at least one group that has the highest similarity with the file fingerprint information to the DDE such that the DDE selects at least one group to query a duplicate data block. In this way, each MDS needs to query only a file fingerprint information set of a group that the MDS itself is responsible for, which reduces the amount of data retrieval and waiting time of reading, writing, and locking a database file. Further, multiple MDSs concurrently complete a similarity analysis, thereby improving performance of the similarity analysis. In addition, in this embodiment of the present disclosure, an MDS completes a large number of calculation and sorting work in the similarity analysis, thereby reducing occupied resources of a DDE.

Figure 7:
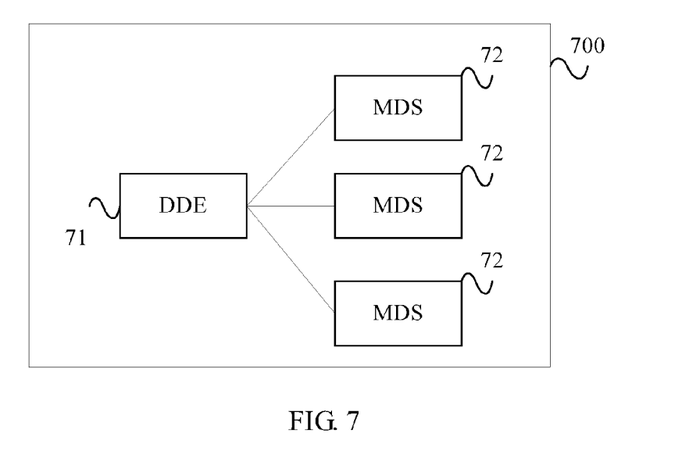
FIG. 7 is a schematic structural diagram of a similarity analysis system 700 according to an embodiment of the present disclosure.

FIG. 7 is a schematic structural diagram of a similarity analysis system 700 according to an embodiment of the present disclosure. As shown in FIG. 7, the system includes a DDE 71 and multiple MDS 72s, where the DDE 71 is a DDE provided in an embodiment of the present disclosure, and each MDS 72 is an MDS provided in an embodiment of the present disclosure.

Further, there are multiple DDE 71s.

Each DDE 71 and each MDS 72 may be located on a same node or different nodes in a storage system. Generally, one MDS and one DDE are set on each node.

For specific implementation of this embodiment, refer to a DDE provided in an embodiment of the present disclosure and an MDS provided in an embodiment of the present disclosure. In this embodiment of the present disclosure, the following technical means are adopted. A DDE sends an analysis request that carries file fingerprint information to at least two MDSs such that the at least two MDSs query, according to the file fingerprint information, their respective local file fingerprint information sets of each group that each MDS is responsible for, selects at least one group according to an analysis result that is returned by each MDS and carries a found group number and a similarity of at least one group that has the highest similarity with the file fingerprint information, and sends block fingerprint information of each data block in the file to be analyzed to the MDS that the selected group belongs to such that the MDS queries a duplicate data block. In this way, each MDS needs to query only a file fingerprint information set of a group that the MDS itself is responsible for, which reduces the amount of data retrieval and waiting time of reading, writing, and locking a database file. Further, multiple MDSs concurrently complete a similarity analysis, thereby improving performance of the similarity analysis. In addition, in this embodiment of the present disclosure, an MDS completes a large number of calculation and sorting work in the similarity analysis, thereby reducing occupied resources of a DDE.

Finally, it should be noted that the foregoing embodiments are merely intended for describing the technical solutions of the present disclosure other than limiting the present disclosure. Although the present disclosure is described in detail with reference to the foregoing embodiments, a person of ordinary skill in the art should understand that he may still make modifications to the technical solutions described in the foregoing embodiments, or make equivalent replacements to some technical features thereof, without departing from the scope of the technical solutions of the embodiments of the present disclosure.

What is claimed is:

1. A data de-duplicate engine (DDE), comprising:
a processor; and
a storage medium coupled to the processor and configured to store a program code, wherein when executing the program code, the processor is configured to:
acquire file fingerprint information of a file to be analyzed;
send an analysis request that carries the file fingerprint information to at least two meta data servers (MDSs), wherein the MDSs are each assigned at least one fingerprint information group, and wherein the MDSs respectively query a local file fingerprint information set in their assigned fingerprint information group according to the file fingerprint information of the file to be analyzed;
receive an analysis result respectively returned by each of the MDSs based on the query, wherein the analysis result comprises a group number of the fingerprint information group which has a highest similarity value with the file fingerprint information of the file to be analyzed among the assigned fingerprint information group, and the similarity value;
select at least one fingerprint information group according to the received analysis result; and
send block fingerprint information of each data block in the file to be analyzed to an MDS of the MDSs that the selected fingerprint information group belongs to, wherein the MDS that the selected fingerprint information group belongs to compares the block fingerprint information of each data block in the file to be analyzed with local block fingerprint information in the selected fingerprint information group to query a duplicate data block.

2. The DDE according to claim 1, wherein when executing the program code, the processor is further configured to:
determine that at least one highest similarity value in the received analysis result is higher than a threshold; and
select at least one fingerprint information group corresponding to the at least one highest similarity value.

3. The DDE according to claim 1, wherein when executing the program code, the processor is further configured to:
determine that no similarity value in the received analysis result is higher than a threshold; and
select at least one idle group.

4. The DDE according to claim 3, wherein when executing the program code, the processor is further configured to:
establish a number of idle groups; and
allocate the number of idle groups to the at least two MDSs according to an allocation policy.

5. The DDE according to claim 4, wherein the analysis result further comprises load information of each MDS, and wherein selecting, by the processor, the at least one idle group comprises selecting, by the processor, at least one idle group that belongs to an MDS with a minimum load according to the load information.

6. A meta data server (MDS), comprising:
a processor; and
a storage medium coupled to the processor and configured to store a program code, wherein when executing the program code, the processor is configured to:
receive an analysis request sent by a data de-duplicate engine (DDE), wherein the analysis request carries file fingerprint information of a file to be analyzed;
respectively acquire a similarity value between the file fingerprint information of the file to be analyzed and each of at least one assigned fingerprint information group through querying a local file fingerprint information set in each of the assigned fingerprint information group according to the file fingerprint information of the file to be analyzed; and
send an analysis result to the DDE, wherein the analysis result comprises a group number of the fingerprint information group which has a highest similarity value with the file fingerprint information of the file to be analyzed among the assigned fingerprint information group, and the similarity value.

7. The MDS according to claim 6, wherein when executing the program code, the processor is further configured to:

acquire similarity values between the file fingerprint information of the file to be analyzed and each of multiple pieces of file fingerprint information in the local file fingerprint information set in the one of the assigned fingerprint information group; and determine the highest similarity value among the acquired similarity values as the similarity value between the file fingerprint information of the file to be analyzed and the one of the assigned fingerprint information group.

8. The MDS according to claim 6, wherein when executing the program code, the processor is further configured to:
receive a query request of the DDE, wherein the query request comprises block fingerprint information of each data block in the file to be analyzed and the group number of the fingerprint information group in the assigned fingerprint information group selected by the DDE; and
compare the block fingerprint information of each data block in the file to be analyzed with block fingerprint information in the selected fingerprint information group to query a duplicate data block.

9. The MDS according to claim 8, wherein when executing the program code, the processor is further configured to:
determine a non-duplicate data block among data blocks in the file to be analyzed based on the comparing the block fingerprint information of each data block;
save block fingerprint information of the non-duplicate data block into the selected fingerprint information group; and
save the file fingerprint information of the file to be analyzed into the selected fingerprint information group.

10. A non-transitory computer readable medium storing a program such that when executed by a processor causes a data de-duplicate engine (DDE) to execute a similarity analysis method, comprising:
acquiring file fingerprint information of a file to be analyzed;
sending an analysis request that carries the file fingerprint information to at least two meta data servers (MDSs), wherein the MDSs are each assigned at least one fingerprint information group, and wherein the MDSs respectively query a local file fingerprint information set in their assigned fingerprint information group according to the file fingerprint information of the file to be analyzed;
receiving an analysis result respectively returned by each of the MDSs based on the query, wherein the analysis result comprises a group number of the fingerprint information group which has a highest similarity value with the file fingerprint information of the file to be analyzed among the assigned fingerprint information group, and a similarity value;
selecting at least one fingerprint information group according to the received analysis result; and
sending block fingerprint information of each data block in the file to be analyzed to an MDS of the MDSs that the selected fingerprint information group belongs to, wherein the MDS that the selected fingerprint information group belongs to compares the block fingerprint information of each data block in the file to be analyzed with local block fingerprint information in the selected fingerprint information group to query a duplicate data block.

11. The non-transitory computer readable medium according to claim 10, wherein selecting the at least one fingerprint information group according to the received analysis result comprises:
determining that at least one highest similarity value in the received analysis result is higher than a threshold; and
selecting at least one fingerprint information group corresponding to the highest similarity value.

12. The non-transitory computer readable medium according to claim 10, wherein selecting at least one fingerprint information group according to the received analysis result comprises:
determining that no similarity value in the received analysis result is higher than a threshold; and
selecting at least one idle group.

13. The non-transitory computer readable medium according to claim 12, wherein before acquiring the file fingerprint information of the file to be analyzed, the method further comprises:
establishing a number of idle groups; and
allocating the number of idle groups to at least two MDSs according to an allocation policy.

14. The non-transitory computer readable medium according to claim 13, wherein the analysis result further comprises load information of each MDS, and wherein selecting at least one idle group comprises selecting at least one idle group that belongs to an MDS with a minimum load according to the load information.

15. A non-transitory computer readable medium storing a program such that when executed by a processor causes a meta data server (MDS) to execute a similarity analysis method, comprising:
receiving an analysis request sent by a data de-duplicate engine (DDE), wherein the analysis request carries file fingerprint information of a file to be analyzed;
respectively acquiring a similarity value between the file fingerprint information of the file to be analyzed and each of at least one assigned fingerprint information group through querying a local file fingerprint information set in each of the assigned fingerprint information group according to the file fingerprint information of the file to be analyzed; and
sending an analysis result to the DDE, wherein the analysis result comprises a group number of the fingerprint information group which has a highest similarity value with the file fingerprint information of the file to be analyzed among the assigned fingerprint information group, and the similarity value.

16. The non-transitory computer readable medium according to claim 15, wherein acquiring the similarity value between the file fingerprint information of the file to be analyzed and one of the assigned fingerprint information group comprises:
acquiring similarity values between the file fingerprint information of the file to be analyzed and each of multiple pieces of file fingerprint information in the local file fingerprint information set in the one of the assigned fingerprint information group; and
determining a highest similarity value among the acquired similarity values as the similarity value between the file fingerprint information of the file to be analyzed and the one of the assigned fingerprint information group.

17. The non-transitory computer readable medium according to claim 15, wherein after sending the analysis result to the DDE, the method further comprises:

receiving a query request of the DDE, wherein the query request comprises block fingerprint information of each data block in the file to be analyzed and a group number of the fingerprint information group in the assigned fingerprint information group selected by the DDE; and comparing the block fingerprint information of each data block in the file to be analyzed with block fingerprint information in the selected fingerprint information group to query a duplicate data block.

18. The non-transitory computer readable medium according to claim 17, wherein the method further comprises:

determining a non-duplicate data block among data blocks in the file to be analyzed based on the comparing;

saving block fingerprint information of the non-duplicate data block into the selected fingerprint information group; and saving the file fingerprint information of the file to be analyzed into the selected fingerprint information group.

* * * * *